Aug. 18, 1936.  C. C. COOK ET AL  2,051,468
GLASSWARE FORMING MACHINE
Original Filed June 14, 1933   6 Sheets-Sheet 1
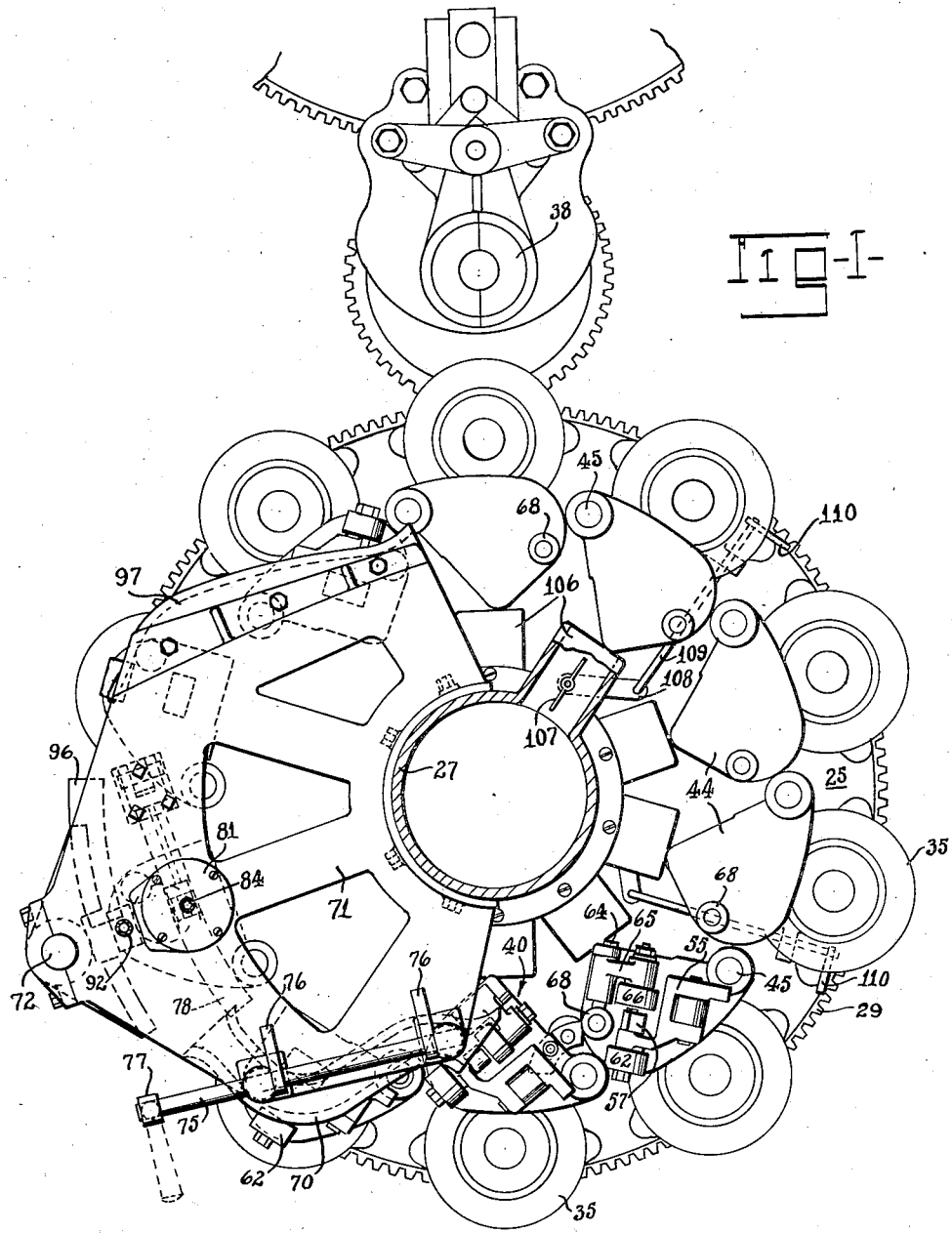
Inventors
Clyde C. Cook
and
Charles Badger
By
J. F. Rule.
Attorney

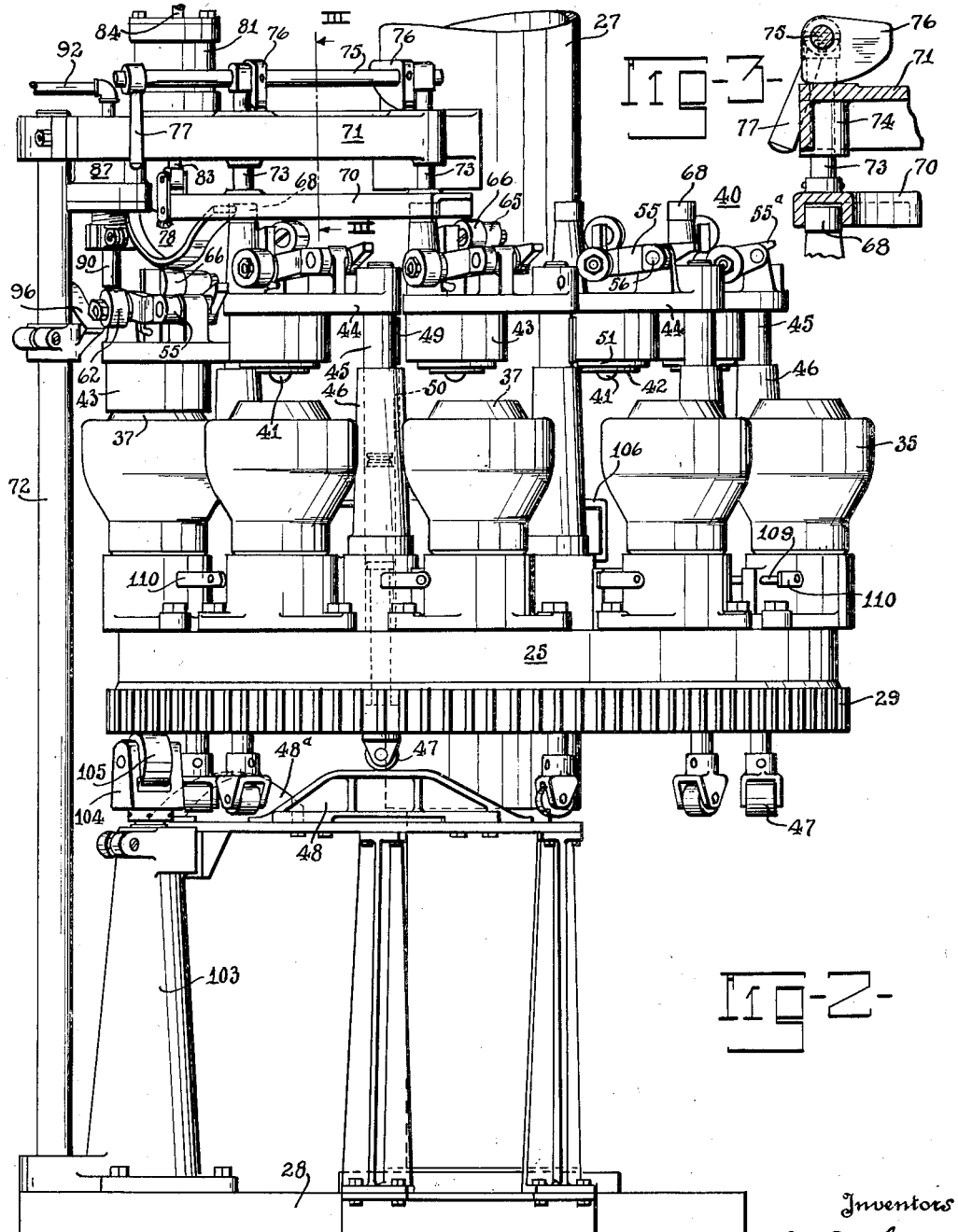

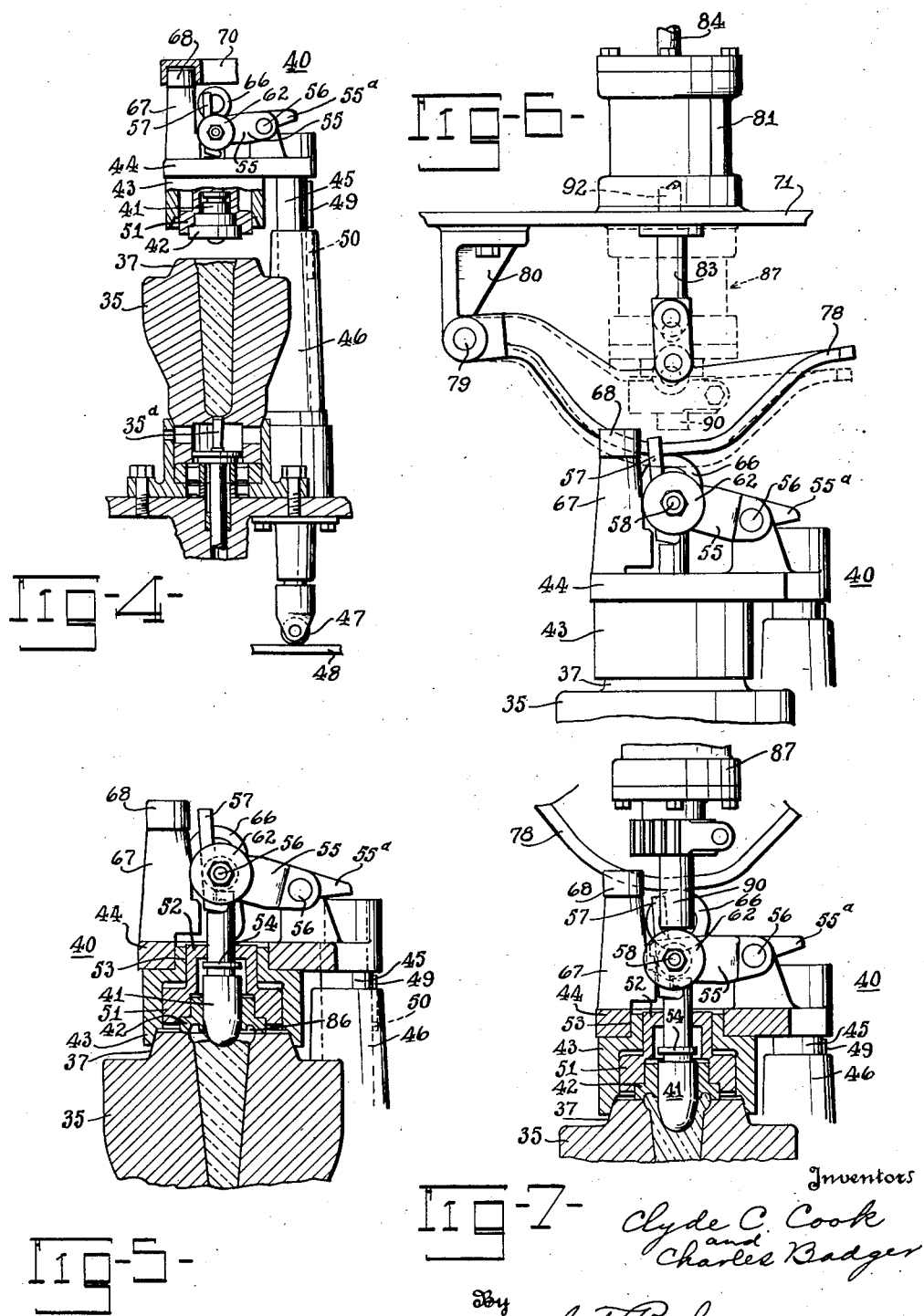

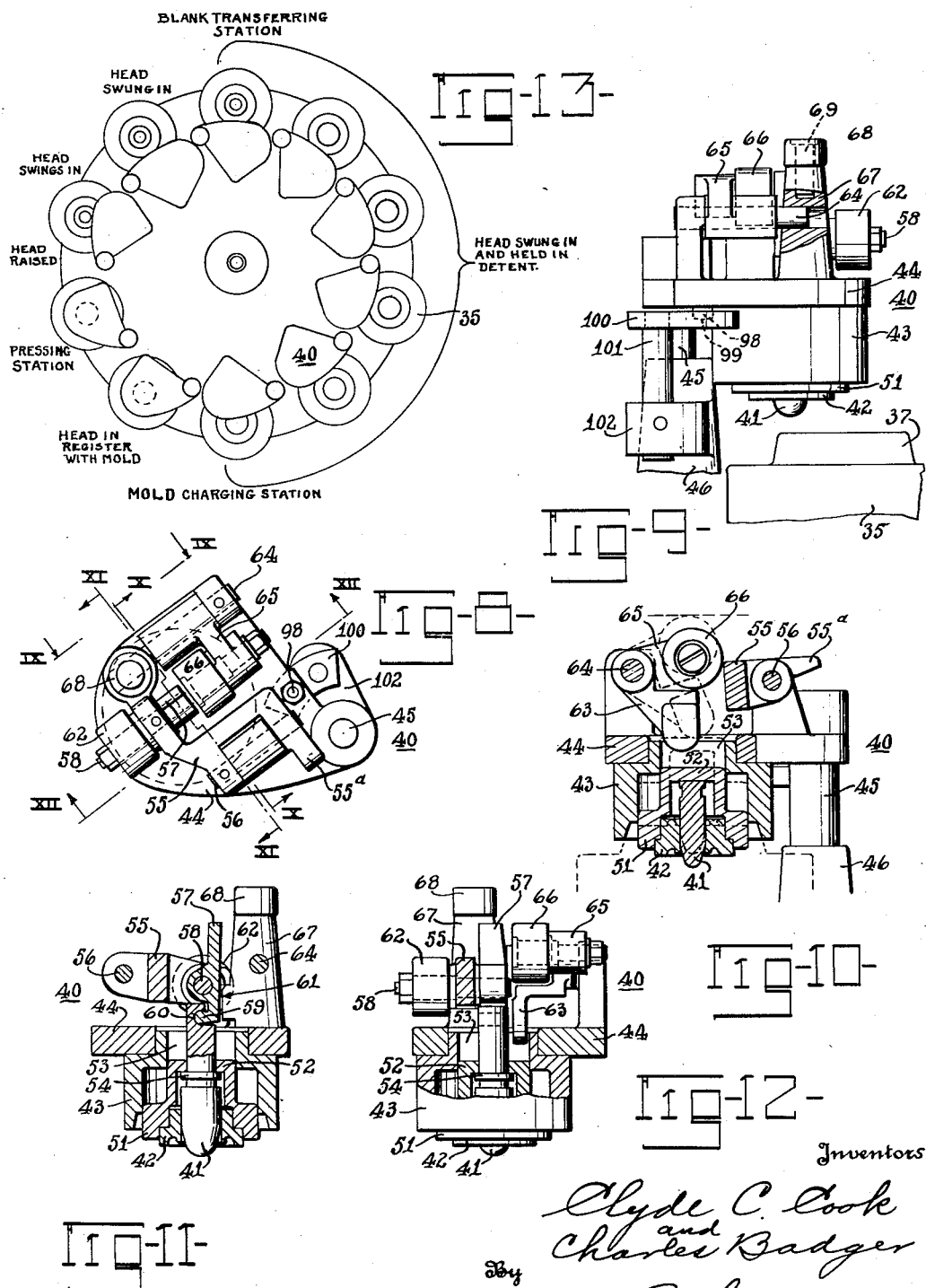

Aug. 18, 1936.  C. C. COOK ET AL  2,051,468
GLASSWARE FORMING MACHINE
Original Filed June 14, 1933  6 Sheets-Sheet 5
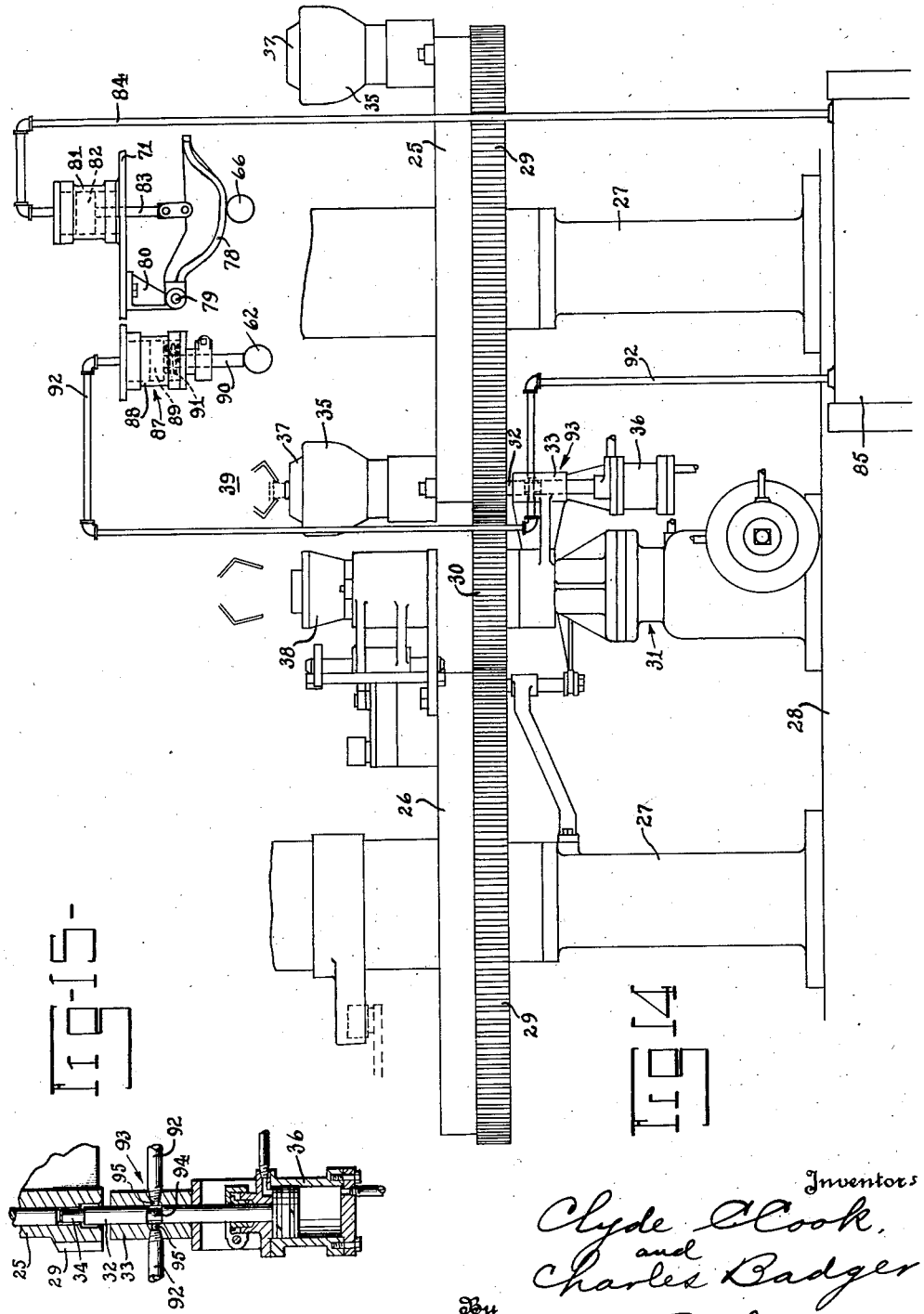
Inventors
Clyde C. Cook,
and
Charles Badger
By J. F. Rule
Attorney Aug. 18, 1936.  C. C. COOK ET AL  2,051,468
GLASSWARE FORMING MACHINE
Original Filed June 14, 1933   6 Sheets-Sheet 6
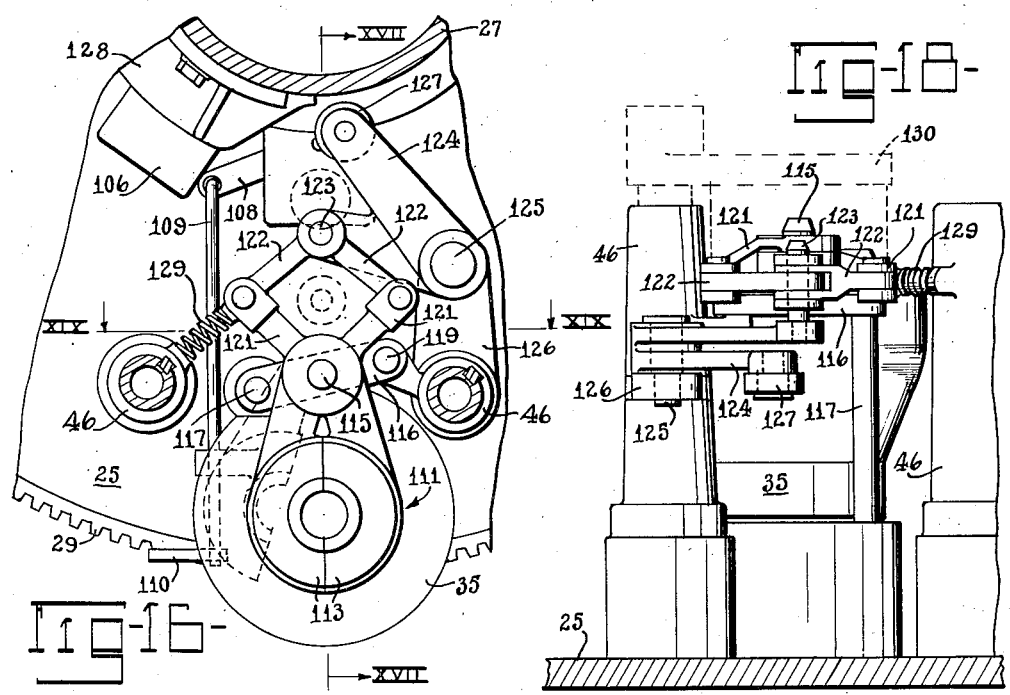
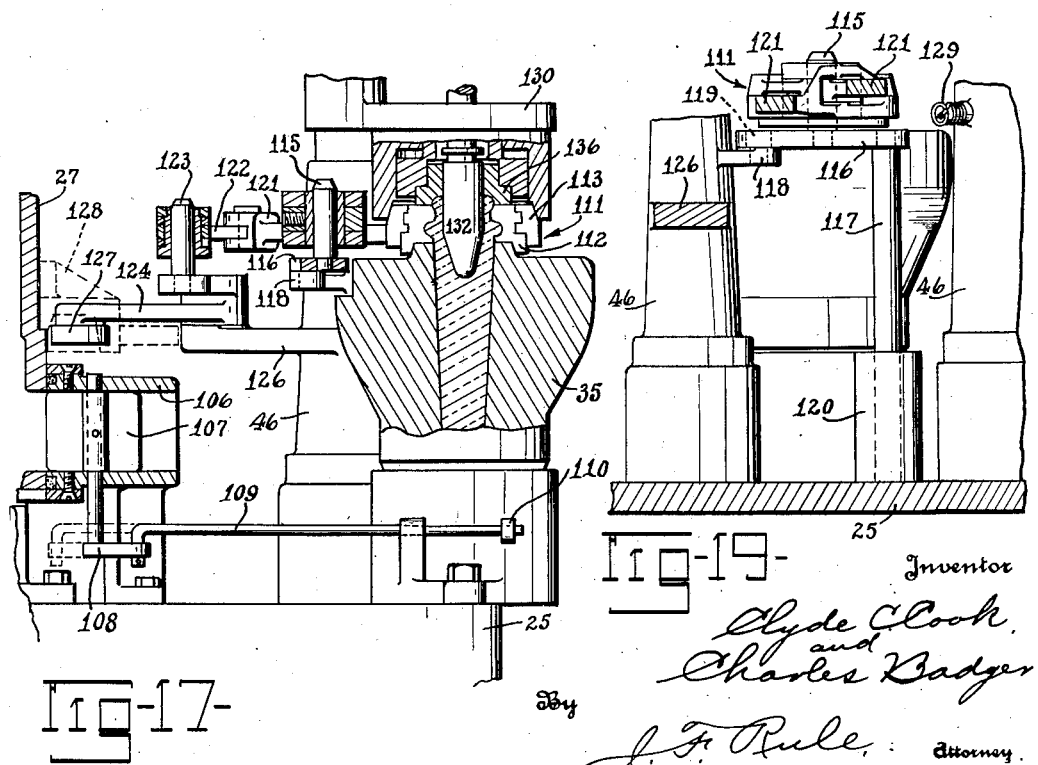
Inventor
Clyde C Cook
and
Charles Badger
By J. F. Rule, Attorney.

Patented Aug. 18, 1936

2,051,468

UNITED STATES PATENT OFFICE 2,051,468

GLASSWARE FORMING MACHINE

Clyde C. Cook and Charles Badger, Columbus, Ohio, assignors to Owens-Illinois Glass Company, a corporation of Ohio Application June 14, 1933, Serial No. 675,750
Renewed January 22, 1936

11 Claims. (Cl. 49—9)

The present invention relates to improvements in glassware forming machines and more particularly to the press and blow type including blank and finishing mold tables arranged side by side and rotating intermittently about spaced vertical axes so that they are brought to a stand still periodically at stations where various operations are performed upon the glass in the molds.

More particularly the present invention is concerned with automatic machines for producing milk bottles. This type of machine ordinarily includes an annular series of upwardly opening blank molds which are brought in succession to charging, pressing and blank transferring stations. At the charging station mold charges of molten glass are dropped by a suitable feeder into the open upper ends of the molds. At the pressing station a unit consisting of a finish or finish ring and pressing plunger is placed in operative position over the blank molds and operated to compact the glass in the blank mold cavity and simultaneously give the neck and sealing surface final form. Upon being brought to a stand still at the blank transferring station the blank or parison is lifted vertically out of the blank mold and placed in a finishing mold in which it is expanded to final shape. Such a structure necessarily prohibits the production of bottles having more than one type of finish for the reason that there can be only one pressing station and at this station is positioned the only plunger and finish ring with which the machine is or under the circumstances can be equipped.

An object of the present invention is the provision of combined finish ring and plunger units individual to and moving with the blank molds. Thus the present invention provides means whereby there may be as many different finishes or neck shapes as there are blank molds.

Another object is the provision of novel means whereby removal and replacement of the pressing plungers may be effected with ease.

A further object is the provision of means whereby a machine of the above type may with facility have any one or more of its blank mold groups equipped with a split or two part finish or neck mold. This is of considerable importance where the bottles being produced include an external rib or bead spaced a short distance below the upper end of the sealing surface.

It is also an object to provide means for cooling the exterior surface of the blank molds on the side facing the axis of the table to thereby effect a substantially uniform extraction of heat from the blank or parison. This results in increased uniformity of distribution of glass in the finished articles. To this end there is included in the machine regulable means for applying cooling wind to the said exterior surface of said molds.

Other objects will be in part apparent and in part pointed out hereinafter.

In the drawings:

Fig. 1 is a fragmentary plan view with parts in section.

Fig. 2 is an end elevational view showing the blank mold table.

Fig. 3 is a sectional view taken along the line III—III of Fig. 2.

Fig. 4 is a fragmentary sectional elevational view showing the relation between the blank mold and corresponding pressing plunger and finish ring at the time the mold moves away from the charging station.

Fig. 5 is a detail sectional elevational view showing the next position of the finish ring and pressing plunger unit.

Fig. 6 is a fragmentary elevational view showing the device for holding the finish ring in sealing contact with the blank mold.

Fig. 7 is a sectional elevational view showing the pressing plunger in its operative position.

Fig. 8 is a detail top plan view of the pressing unit.

Fig. 9 is a sectional elevational view taken substantially along the line IX—IX of Fig. 8.

Fig. 10 is a detail sectional view taken substantially along the line X—X of Fig. 8.

Fig. 11 is a sectional view taken along the line XI—XI of Fig. 8.

Fig. 12 is a sectional view taken along the line XII—XII of Fig. 8.

Fig. 13 is a diagrammatic plan view showing the relative positioning of the blank molds and pressing head units.

Fig. 14 is a view more or less diagrammatically illustrating the air pipe lines and relation between the blank and finishing mold groups.

Fig. 15 is a detail sectional elevational view showing the combined mold table locking device and valve for controlling the flow of air to the pressing plunger motor.

Figs. 16, 17, 18, and 19, are views illustrating a device whereby a split neck mold may be readily operated with any of the blank molds. Fig. 16 is a plan view. Fig. 17 a sectional elevational view taken along the line XVII—XVII of Fig. 16. Fig. 18 is a rear elevational view of the unit. Fig. 19 is a transverse sectional elevational view taken along the line XIX—XIX of Fig. 16.

The illustrated embodiment of the present invention is shown in connection with a two table press and blow machine which consists of horizontal blank and finishing mold tables 25 and 26 respectively, arranged side by side for intermittent rotation about the vertical axes of columns 27 or pedestals rising from a base 28. These tables are provided with ring gears 29 meshing with a driving pinion 30 which is rotated periodically by driving mechanism 31 of conventional or any preferred form. A locking pin 32 designed to secure the tables against movement during the rest period is mounted in a vertical guide 33 for upward projection into recesses 34 individual to the blank molds 35, such projection being effected by means of a vertical piston motor 36. This motor and pin guide 33 may well be mounted upon the housing or some other fixed part of the driving mechanism 31. The blank molds 35 are arranged in an annular series about the margin of the table 25, each mold including a reduced frusto-conical extension 37 designed to provide a tapered centering and sealing surface for contact with a part of the corresponding pressing head unit as will be brought out hereinafter. Push pins 35ᵃ (Fig. 4) individual to the molds raise the blanks sufficiently to permit the transferring tongs 39 to grasp the upper end of the blanks. An annular series of finishing molds 38 of conventional form are carried by the finishing mold table 26. Tongs 39 are arranged above and in proximity to the adjacent sides of the mold tables and are operated to transfer blanks or parisons from the blank molds to the finishing molds. All of the above structure may, as shown, be of conventional form.

The present invention includes an annular series of pressing head units 40 individual to the blank molds 35 and normally travelling in a substantially circular path within the circle defined by the blank molds. These pressing head units are moved radially outward after the mold charging operation for cooperation with the blank molds and after the blank pressing operation are returned to their normal position a short distance radially inward from the circle of the blank molds.

Each pressing head unit (Figs. 2 and 4 to 12 inclusive) consists of a pressing plunger 41 disposed within a finish ring 42 and a combined centering and sealing sleeve 43 all of which are supported in a horizontal carrier 44 secured at one end to the upper end of a vertical rock shaft 45. This rock shaft 45 is mounted in a vertical guide 46 or bearing rising from the blank mold table 25. The rock shaft consists of upper and lower sections, the latter carrying a roller 47 at its lower end for engagement with cams 48 and 48ᵃ (Fig. 2) which regulate and control the vertical movement of the rock shaft by means of which movement the pressing head unit is moved into and out of operative engagement with the corresponding blank mold. A key 49 on the upper section of the rock shaft 45 immediately beneath the carrier 44 normally rests upon the upper end of the guide 46 and thereby supports the pressing head in its inoperative position. When the pressing head is in vertical alignment with the corresponding blank mold the key 49 is likewise in alignment with a longitudinal keyway 50 formed internally of the guide 46. The lower section of the rock shaft may have splined connection with the lower part of the guide 46 so that the roller 47 is at all times in proper position for engagement with the cams 48. Normally the lower section of the rock shaft is spaced from the upper section. Just prior to outward swinging of the pressing head unit the roller 47 rides upon one end of the cam 48 thereby bringing the two sections of the rock shaft into engagement with each other. Later when the key 49 is in register with the keyway 50 the roller rides down the opposite end of the cam 48 and thereby lowers the unit into engagement with the corresponding blank mold. After the pressing operation the unit is again lifted to the level previously occupied and swung radially inward to disalign the key 49 and keyway 50. The lifting cam 48ᵃ is then terminated with the result that the lower section of the rock shaft drops away from the upper section, leaving the latter and the pressing head resting upon the corresponding guide.

With respect to the specific construction of the pressing head a thimble 42 or finish ring is secured in a holder 51 which has a reduced closed upper end 52 slidingly fitted in a guide opening 53 in the corresponding end of the centering sleeve 43. An external flange 54 or bead encircling the upper part of the plunger 41 supports said holder 51 and thimble 42. The plunger 41 is adapted for vertical movement into and out of the blank mold. The construction permitting such movement includes an arm 55 pivoted to a horizontal hinge pin 56 on the upper side of the carrier 44. A pivoted latch 57 mounted upon a horizontal hinge pin 58 at the outer end of the arm 55 has a finger 59 formed at its lower end for projection into a lateral recess 60 at the upper end of the plunger. Thus separable connection between the arm 55 and plunger is provided thereby facilitating removal and replacement of both the plunger and thimble or finish ring. Premature disengagement between the plunger and latch is avoided by providing a stop 61 (Fig. 11) for limiting swinging movement of the latch during the time the plunger occupies any of its normal positions. Only by a manual operation can the plunger be moved high enough to permit such swinging of the latch as will disconnect the lower end thereof from the plunger. A finger piece 55ᵃ facilitates manual rocking of the latch when the plunger is to be removed. A cam roller 62 is mounted upon the outer end of the horizontal hinge pin 58 for engagement with the plunger projecting means referred to hereinafter.

Effective sealing engagement between the finish ring 42 or thimble and the blank mold 35 is obtained by applying top pressure to the thimble holder 51. The construction involved consists of a pivoted arm 63 mounted upon a horizontal hinge pin 62 on the upper side of the carrier 44. A lever 65 suitably connected to the arm 63 carries a cam roll 66 at its outer end designed for engagement with means for moving the lever and arm downwardly about the hinge pin 64. The arm 63 while at the pressing station has its lower end engaged with the closed upper end of the thimble holder 51.

Rising from the carrier 44 is a post 67 which at its upper end carries a cam roll 68 mounted for rotation on a vertical pin 69.

After a mold charge of glass has been dropped into one of the blank molds at the charging station (Fig. 13) the blank mold table is indexed and during such indexing movement the pressing head unit is swung radially outward into vertical alignment with the corresponding blank mold.

This is accomplished by bringing the cam roller 68 into engagement with a stationary cam 70 (Figs. 1 and 2). This cam is suspended from a supporting plate 71 which is mounted upon the upper part of the central column 27 and a vertical post 72.

In order that the machine may be operated without moving the pressing heads outwardly over the molds the cam 70 is capable of movement into and out of operative position. To this end the cam is connected through a pair of vertical guide rods 73 extending through guides 74 on the supporting plate 71 to a rock shaft 75 above said plate 71. A pair of cams 76 secured to the rock shaft 75 are shaped to support said shaft in either of two positions with respect to the plate 71. In one position the cam 70 is so located that it engages the cam rollers 68 while in the other position it is spaced a short distance above the path of travel of said rollers. A handle 77 or lever fixed to one end of the rock shaft 75 provides means whereby said shaft may be operated manually to change the setting of the cam 70.

Simultaneously with arrival of the mold group at the pressing station (Fig. 13) previous to which the pressing head has moved downward to a rest position upon the blank mold, the cam roller 66 (Figs. 6, 7, 10, 12) is brought into engagement with the lower side of a pivoted presser bar 78 or cam which applies top pressure to the thimble or finish ring holder 51. This presser bar 78 or cam is pivoted to a horizontal hinge pin 79 (Figs. 6, 14) which in turn is mounted upon a bracket 80 depending from the supporting plate 71. Constant downward pressure is applied to the presser bar 78 by means including an air cylinder 81 in which is arranged a piston 82 connected to the bar 78 by means of a piston rod 83. This cylinder 81 which is mounted upon the outer side of the supporting plate 71 has its upper end connected to an air supply pipe 84 leading to a compressed air tank 85. Air under pressure is constantly applied to the upper side of the piston 82 with the result that the presser bar is normally yieldingly held in a position a short distance below the lowermost position of the rollers 66. As a result movement of the mold groups into position below said presser bar lifts the latter a short distance and insures such application of pressure to the thimble holder 51 as will effect satisfactory sealing engagement between the thimble or finsh ring and mold.

Substantially simultaneously with such application of pressure to the thimble holder the plunger 41 is projected downwardly into the blank mold thereby displacing a part of the mold charge of glass and causing it to fill a neck cavity 86. This operation also compacts the entire mass of glass in the mold cavity. Such downward movement of the plunger is obtained by mechanism comprising a vertical piston motor 87 suspended from the lower side of the supporting plate 71 and including a cylinder 88, a piston 89, and a piston rod 90 depending therefrom for engagement with the rollers 62 which form part of the pressing head units. A coil spring 91 encircling the piston rod 90 below the piston 89 normally holds the latter in its uppermost position. Air under pressure is supplied to the upper end of the cylinder periodically through a supply pipe 92 which is connected to the compressed air tank 85. A valve 93 forming a part of the table locking device (Figs. 14, 15) regulates and controls the flow of air through said pipe 92. This valve consists merely of an annular chamber 94 encircling the locking pin 32 within the guide 33 and opposed ports 95 in said guide communicating with the two sections of the pipe 92. Upward movement of the locking pin 32 under influence of the piston motor 36 to momentarily secure the mold table against rotation, positions the annular channel 94 so that it establishes communication between the two ports 95 with the result that air under pressure flows through the pipe to the piston motor 87 and forces the piston 89 downwardly. Thus the plunger is projected into the mold.

Movement of the mold group away from the pressing station which is preceded by shutting off the flow of air under pressure to the plunger projecting motor 87 is accompanied by engagement of the roller 62 with the upper side of a stationary cam 96 mounted on the post 72. This cam withdraws the plunger from the mold and lifts the thimble 42 or finish ring away from the blank mold. Substantially simultaneously with the plunger withdrawing operation (Fig. 2) the entire pressing head unit is raised by engagement of the roller 47 at the lower end of the rock shaft 45 with a stationary cam 48ª. By means of a stationary cam 97 suspended from the lower side of the suporting plate 71 the pressing head unit is again moved inwardly to its inoperative position.

The pressing head is securely held against premature outward movement by means of a detent 98 (Figs. 1, 8) which enters a recess 99 in the upper side of a plate 100, said plate mounted upon a post 101 which is fixed at its lower end in a horizontal arm 102 on the rock shaft guide 46.

In order that the blank mold table may not be subjected to distortion to any great degree as a result of the successive pressing operations, a support for the table is arranged directly beneath the table at the pressing station. This support takes the form of a pedestal 103, an adjustable roller carrier 104, and a roller 105, the latter constantly engaging the lower surface of the ring gear 29.

Cooling of the exterior surface of the blank molds facing the axis of rotation of the table is obtained by connecting the rotary upper end of the hollow column 27 to a source of supply of cooling air (not shown) and providing exhaust ports 106 individual to the molds. Each exhaust port is equipped with a damper 107 connected through a lever 108 and push rod 109 to a handle 110, the latter being positioned in proximity to the molds and within easy reach of the operator. By moving the push rod 109 in the direction of its length the damper may be adjusted to regulate the volume of cooling air exhausted for impingement against the adjacent surfaces of the corresponding blank mold.

In operation, the machine is rotated intermittently with the result that the blank molds are brought in succession to the mold charging station (Fig. 13) and held stationary while a charge of molten glass is dropped into the cavity. During movement of the blank mold to the next station the cam 70 swings the pressing head unit outwardly into vertical alignment with the mold and the cam 48 lowers the unit into contact with said mold. At the pressing station the thimble or finish ring holder is placed under top pressure by the presser bar 78 and immediately thereafter the plunger 41 is projected into the mold cavity as indicated heretofore. Thus the blank or parison is given its final shape. The glass is set sufficiently at the neck end by engagement with the metal molds and plunger to permit suspension of the blank from the tongs 39 during the blank transferring operation. After the blank forming operations the entire pressing head unit is moved vertically upward and then swung inwardly to its inoperative position. Upon completion of the inward swinging movement of the pressing head unit the lower section of the rock shaft moves downwardly to its lowermost position.

In Figs. 16, 17, 18, and 19, there is illustrated a split neck mold 111 such as is necessary in the production of bottles or the like articles in which an external rib or shoulder is formed a short distance below the upper end thereof. The construction is such that the entire unit including the neck mold and its operating mechanism may readily be removed and replaced. The neck mold includes two sections 112 carried by a pair of holders 113 or arms pivoted to a vertical hinge pin 115 rising from a cross bar 116 which is mounted upon a post 117 and a bracket 118, the latter being formed integral with the rock shaft guide 46 and carrying an upstanding pin 119 projecting into a vertical opening in said cross bar 116. Both the post 117 and cross bar 116 may be readily removed from the table, it being noted that the lower end of said post is freely held in a guide 120. A pair of arms 121 on the neck mold holders 113 are connected together by a pair of links 122 which by means of a vertical pin 123 are secured together and to one end of a bell crank lever 124. This bell crank lever is pivoted to a vertical hinge pin 125 at the outer end of an arm 126 on the rock shaft guide 46 and carries a cam roll 127 which when the mold is to be opened engages a cam 128 on the central column 27. Normally the neck mold is held closed by means of a coil spring 129 which is interposed between the outer end of one of the arms 121 and the adjacent rock shaft guide 46.

Upon complete closing of the neck mold at the upper end of the blank mold the pressing head unit 130 (Fig. 17) is brought into position to apply top pressure to the finish ring 131 and neck mold. The plunger 132 is then projected into the neck and blank molds. These various parts of the pressing head unit 130 may well be, and in accordance with the present disclosure are, constructed as described heretofore and operated by the same series of presser bars and piston motors.

Modifications may be resorted to within the spirit and scope of the appended claims.

What we claim is:

1. A glassware forming machine comprising an annular series of upwardly opening blank molds mounted for movement about a vertical axis, an annular series of pressing head units mounted for movement about said vertical axis in a closed path, a major portion of which is within the circle defined by the blank mold path, means for imparting step-by-step movement to said molds and units bringing them to a standstill at mold charging and pressing stations, means for moving said units radially outward and downward into operative position in contact with the upper ends of the molds during movement of the latter from the charging station to the pressing station, means for operating said units to complete transformation of the glass into blanks at the pressing station, means for then moving said units upwardly and radially inward away from the molds, and means for transforming the blanks into finished articles.

2. A glassware forming machine comprising blank and finishing mold tables arranged side by side and rotating about separate vertical axes, a series of upwardly opening blank molds carried by the blank mold table, a series of finishing molds mounted upon the finishing mold table, pressing head units individual to the blank molds mounted upon said blank mold table, means for imparting step-by-step movement to said tables whereby the blank molds and said units are brought to a standstill one at a time at charging and pressing stations, means for moving said units to an operative position in contact with the corresponding molds after glass has been delivered at a charging station and while the molds are moving to said station, means for operating the units at the pressing station to completely form blanks, means for moving the units to an inoperative position during travel of the molds, and means for transferring the blanks to finishing molds for final shaping.

3. In a glassware forming machine, an annular series of upwardly opening blank molds mounted for rotation about a vertical axis past charging, pressing, and blank transferring stations, pressing head units individual to the blank molds, each unit including a plunger and finish ring, means operating during travel of the molds for moving said units into register with the molds in advance of the pressing station, means operating during travel of the molds to said station for applying top pressure to the finish ring and effecting sealing contact between it and the blank mold, means for projecting the plunger into the blank mold at said pressing station for filling the finish ring and compacting the glass, means for removing the units from engagement with the molds, and means for transforming the blanks into finished articles.

4. In a glassware forming machine, an annular series of upwardly opening blank molds mounted for rotation about a vertical axis past charging, pressing, and blank transferring stations, pressing head units individual to the blank molds, each unit including a plunger and finish ring, means for moving said units into register with the molds in advance of the pressing station, a yielding presser bar common to the several pressing head units operating at and in the advance of the pressing station to effect sealing engagement between the finish ring and blank mold, pneumatic means beside the presser bar at the pressing station for projecting the plunger into the blank mold and thereby forcing part of the glass into the finish ring and completely forming a blank, means common to the molds operating after the pressing operation to remove the units from engagement with the mold, and means for transforming the blanks into finished articles.

5. A glassware forming machine comprising an annular series of upwardly opening blank molds mounted for rotation about a vertical axis, means for imparting intermittent rotation to the molds to thereby bring them to mold charging, pressing and blank transferring stations, pressing heads individual to the molds mounted for oscillation about separate vertical axes and vertical movement along said axes, a cam for swinging the units outwardly into vertical alignment with the blank molds, means for then lowering the units into engagement with the upper end of the blank molds, yielding means for holding a part of said units in sealing contact with the molds at the pressing station, means for moving the units away from the molds to an inoperative position, and means for moving said cam to a position in which it does not engage the units.

6. A glassware forming machine comprising an annular series of upwardly opening blank molds mounted for rotation about a vertical axis, means for imparting intermittent rotation to the molds to thereby bring them to mold charging, pressing, and blank transferring stations, pressing heads individual to the molds mounted for oscillation about separate vertical axes and vertical movement along said axes, a cam for swinging the units outwardly into vertical alignment with the blank molds, means for then lowering the units into engagement with the upper end of the blank molds, yielding means for holding a part of said units in sealing contact with the molds at the pressing station, means for removing the units away from the molds to an inoperative position, and means for raising and lowering the unit swinging cam whereby in one position it is spaced above the path of travel of said units in an inoperative position.

7. A pressing head unit comprising a carrier, a centering sleeve depending from said carrier, a finish ring and holder secured together and mounted for limited vertical movement in said sleeve, a plunger arranged for limited movement through said finish ring, means above said carrier for supporting the plunger, and means whereby said plunger limits downward movement of the finish ring and holder in said centering sleeve.

8. A pressing head unit comprising a carrier, a centering sleeve depending from said carrier, a finish ring and holder secured together and mounted for limited vertical movement in said sleeve, a plunger arranged for limited movement through said finish ring, means above said carrier for supporting the plunger, and means whereby said plunger limits downward movement of the finish ring and holder in said centering sleeve, said plunger supporting means including a pivoted arm, and a latch at the outer end of the arm separably connecting said arm and plunger.

9. A glassware forming machine comprising an annular series of blank molds mounted for rotation about a vertical axis, means for imparting intermittent rotative movement to said molds, said molds having upwardly facing charging openings, pressing head units individual to the blank molds mounted for rotation therewith, each unit including a finish ring and plunger, a carrier plate for said ring and plunger, a presser bar arranged to apply top pressure to the finish ring as the corresponding mold approaches a pressing station, pneumatic means for normally holding said presser bar in its lowermost position, means for projecting the plunger into the mold to complete formation of a blank, and means for operating said carrier plate to thereby remove the plunger and finish ring from operative engagement with the mold.

10. In a glassware forming machine the combination of a mold table mounted for rotation about a vertical axis, means for rotating the table, an annular series of mold units on said table, each unit including a pair of circumferentially spaced vertical posts, a body blank mold therebetween having an upwardly facing charging opening, a split neck mold, a neck mold holder including a pair of arms pivoted together, toggles connected to and extending radially inward from said arms, spring means interposed between the toggles and one of said posts and operating to yieldingly hold the neck mold closed, a vertical hinge pin supported by the other post and connected to the mold arms at their pivot, an arm extending inwardly from said other post, a cam operated bell crank lever pivoted to said arm and toggles and operable to open the neck mold, and glass compacting means including a finish ring and plunger.

11. A glassware forming machine comprising a mold table mounted for rotation about a vertical axis, means for rotating the table, an annular series of mold units on said table, each unit including a pair of circumferentially spaced vertical posts, a body blank mold arranged between said posts and having an upwardly facing charging opening, a neck mold for cooperation with the blank mold, said neck mold including two separable sections, a pair of pivoted arms supporting said sections, a hinge pin mounted in part on one of the posts and connected to said arms at the pivot, a toggle extending inwardly from and connected to said arms, a spring disposed between the toggle and the other post and operating to yieldingly hold the neck mold closed, a bell crank lever operatively connected to said toggle, a cam for rocking the bell crank lever to thereby open the neck mold in opposition to the spring, and glass compacting means including a finish ring and plunger therein.

CLYDE C. COOK.
CHARLES BADGER.